(12) United States Patent
Masset

(10) Patent No.: US 7,267,048 B2
(45) Date of Patent: Sep. 11, 2007

(54) WINE PRESS

(75) Inventor: Jean-Pierre Masset, Reims (FR)

(73) Assignee: Les Pressoirs Coquard, Reims (FR)

( * ) Notice: Subject to any disclaimer, the term of this patent is extended or adjusted under 35 U.S.C. 154(b) by 816 days.

(21) Appl. No.: 10/240,326

(22) PCT Filed: Apr. 4, 2001

(86) PCT No.: PCT/FR01/01008

§ 371 (c)(1),
(2), (4) Date: Apr. 15, 2003

(87) PCT Pub. No.: WO01/74182

PCT Pub. Date: Oct. 11, 2001

(65) Prior Publication Data

US 2003/0150331 A1    Aug. 14, 2003

(30) Foreign Application Priority Data

Apr. 4, 2000 (FR) .................................. 00 04275

(51) Int. Cl.
*B30B 9/06* (2006.01)

(52) U.S. Cl. ...................... 100/116; 100/127; 100/240; 100/295

(58) Field of Classification Search ................ 100/104, 100/110, 116, 125, 126, 127, 131, 178, 179, 100/214, 226, 240, 245, 295
See application file for complete search history.

(56) References Cited

U.S. PATENT DOCUMENTS

| | | | | |
|---|---|---|---|---|
| 530,914 | A * | 12/1894 | Swenson | 100/179 |
| 1,609,154 | A * | 11/1926 | Carteret | 100/238 |
| 3,550,775 | A * | 12/1970 | Cooley | 210/770 |
| 3,672,520 | A * | 6/1972 | Linville | 414/513 |
| 4,158,332 | A * | 6/1979 | Melandri | 100/127 |
| 4,552,500 | A * | 11/1985 | Ghibaudo et al. | 414/408 |
| 5,377,584 | A * | 1/1995 | Egretier | 100/110 |

FOREIGN PATENT DOCUMENTS

| | | |
|---|---|---|
| DE | 12 47 002 | 5/1963 |
| FR | 2 533 940 | 4/1984 |
| FR | 2 701 816 | 9/1994 |

* cited by examiner

*Primary Examiner*—Jimmy Nguyen
(74) *Attorney, Agent, or Firm*—Egbert Law Offices

(57) ABSTRACT

A wine press for use in particular, but not exclusively, for pressing grapes for producing champagne. It is horizontal and includes an open-work base and pressing mechanisms formed of at least an axially mobile tray. The pressing mechanisms have a configuration adapted, during pressing, to shape the marc cake into a block so that at least a portion thereof is cantilevered by the simple removal of one at least of the pressing mechanisms, so that the portion can collapse into the chamber of the press onto the open-work base.

9 Claims, 2 Drawing Sheets

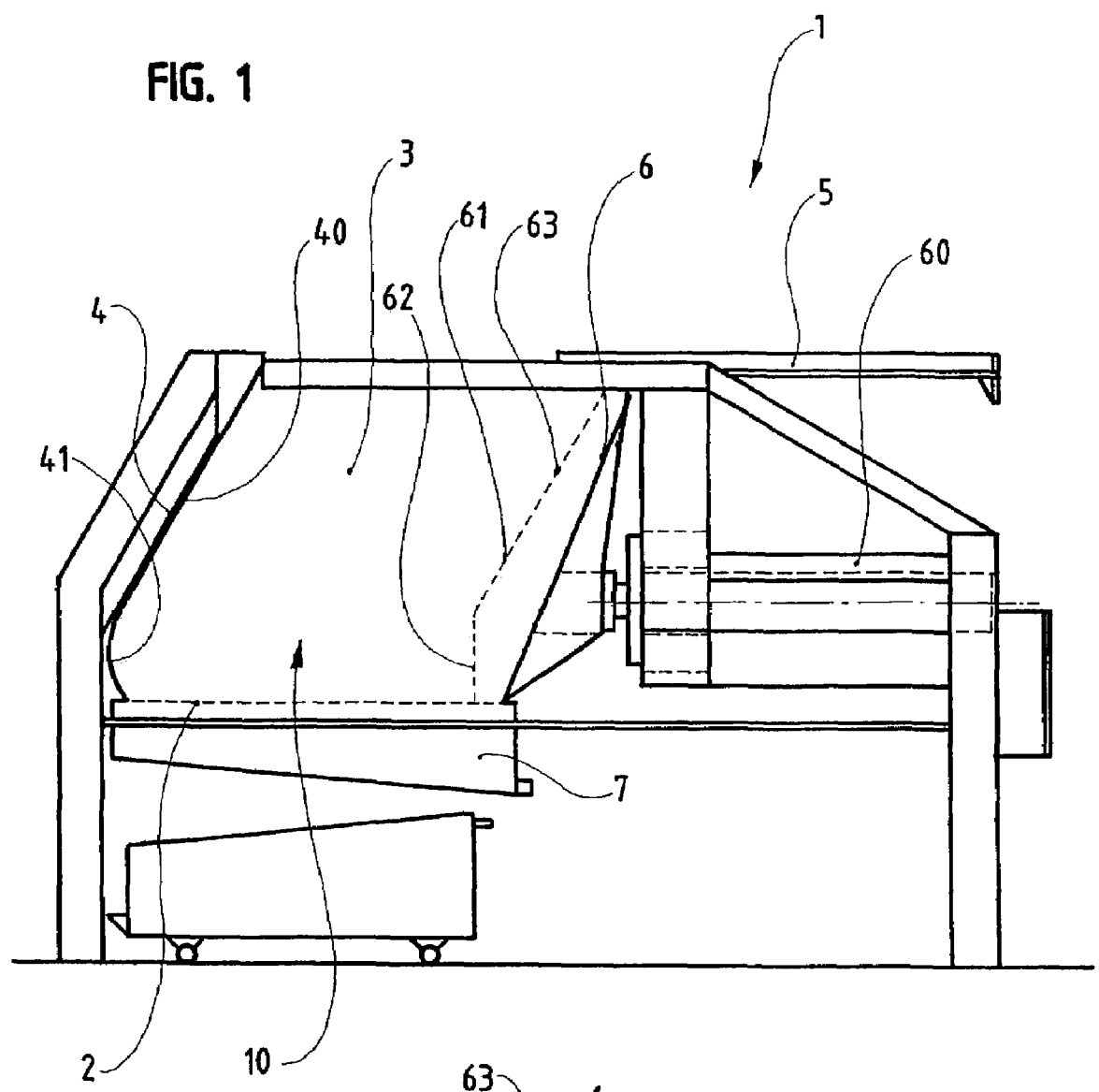
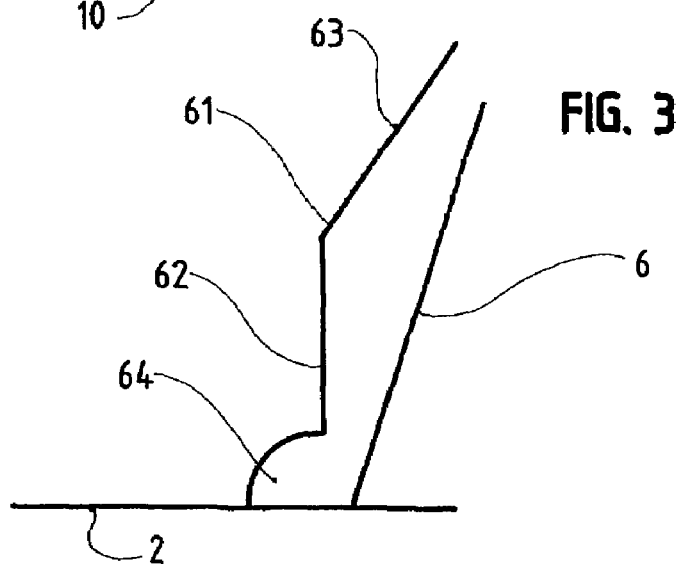

WINE PRESS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention concerns a wine press for use in particular, but not exclusively, for pressing grapes for producing champagne.

BACKGROUND OF THE INVENTION

The pressing of the grapes is generally carried out in several grape-pressurizing cycles, each cycle being followed by a marc-crumbling operation, or toeing-up, inside the wine press.

By way of an example, in the particular field of the production of champagne, the pressing includes a first slow pressure-raising step that allows achieving the cuvée that represents a quantity of 20.5 hl for 4,000 kg of grapes, then, after a crumbling, a second operation consisting of one or several more important pressings, each followed by a crumbling, providing the taille representing 5 hl, also for 4,000 kg of grapes.

The wine presses are traditionally vertical, they are however progressively replaced by the horizontal wine presses.

The vertical wine presses include a receptacle in which are placed the grapes, and pressing means actuated vertically, through a screw or a jack, capable of compressing the grapes in said receptacle. In these vertical wine presses, the crumbling is performed manually, by means of spades and forks.

The horizontal wine presses are mainly of two types, with a membrane or with pistons. They include a cylindrical basket for receiving the grapes, in which acts either an axially arranged inflatable membrane capable of compressing the grapes against the wall of said basket, or a circular or rectangular tray, movable in axial translation, capable of crushing the grapes against a wall, or two circular or rectangular trays movable towards each other. In these wine presses, the crumbling of the marc cake is carried out through rotation of the basket, after removal of the pressing means, i.e. deflating of the membrane or drawing back of the tray or trays.

The horizontal wine presses have been implemented in order to facilitate the crumbling and the emptying operations and to limit the manual interventions; they do however have drawbacks when performing these operations.

The pressure exerted during the pressing is indeed such that, despite the movement of the basket, the marc can remain agglomerated against the wall of the latter, so that the crumbling and the emptying of the marc requires nonetheless manual interventions.

BRIEF SUMMARY OF THE INVENTION

The present invention is aimed at providing a wine press allowing coping with these various drawbacks and that, in addition, offers the advantage of an easier cleaning.

The wine press object of the present invention is of the horizontal type including an open-work bottom and pressing means consisting of at least one axially moving tray, and is mainly characterized in that the pressing means have a configuration capable, during pressure, of shaping the marc cake into a block so that at least one portion of it is cantilevered by the simple removal of one at least of said pressing means, so that said portion is likely to collapse into the chamber of the wine press.

After removal of the pressing means, the cantilevered portion of the marc cake collapses and is aerated before the next pressing.

According to an additional feature of the wine press according to the invention, the wall of one pressing means, aimed at entering into contact with the grapes, has, at its base or in the vicinity of the latter, a convex profile capable of creating in the marc cake at least a recess that, during the removal of said pressing means, creates a cavity that can undermine the base of said marc cake and cause it to collapse.

According to a particular embodiment of the wine press according to the invention, the wall of one pressing means, aimed at entering into contact with the grapes, has at least a portion inclined towards the means for moving said pressing means, while the wall of the other pressing means, aimed at entering into contact with the grapes, has, in front of said portion, at least a portion with a complementary or substantially complementary profile.

The walls of the pressing means can have several portions allowing splitting the block of marc formed after pressing into several portions, so that at least one of them collapses upon removal of at least one of the pressing means.

Pressing means can thus be designed that allow shaping the marc into a block having two superposed portions shifted with respect to a vertical plane and connected to each other by a slanted portion, the removal of at least one pressing means causing the slanted portion to break and, hence, the upper portion of the block to collapse.

According to an additional feature of the particular embodiment of the wine press according to the invention, the wall of the pressing means having at least one portion inclined towards the means for moving said pressing means includes, at its base or in the vicinity of the latter, at least one transversal prominence.

According to an additional feature of the wine press according to the invention, the pressing means have a configuration that is capable, when resuming the pressing after the collapse of the cantilevered portion of the marc block, of creating turbulences allowing causing the non-collapsed portion of said block to raise within the chamber of the wine press, at least partially, under the action of a thrust exerted on its collapsed portion.

According to a particular embodiment of the wine press according to the invention, the wall of the pressing means arranged on the side opposite the one where the cantilevered portion of the marc bloc collapses has, at its lower side, a concave curved transversal portion.

According to an additional feature of the particular embodiment of the wine press according to the invention, the concave curved transversal portion of the wall has a constant cross-section having the shape of an arch of a circle, while the portion of said wall located immediately above is tangent to said concave curved transversal portion.

According to another additional feature of the particular embodiment of the wine press according to the invention, the wall, aimed at entering into contact with the grapes, of the pressing means on the side where the cantilevered portion of the marc block should collapse has, in front of the concave curved transversal portion of the wall of the other pressing means, a substantially vertical lower portion.

According to an additional feature of the of the wine press according to the invention, the wall of at least one of the pressing means is perforated, in order to allow the must to flow out during a pressing operation.

According to a preferred embodiment of the wine press according to the invention, one of the pressing means is fixed, while the other one consists of a movable tray.

The advantages and features of the device according to the invention will become clear when reading the following description, which refers to the attached drawing, which shows a non-restrictive embodiment of it.

BRIEF DESCRIPTION OF THE SEVERAL VIEWS OF THE DRAWINGS

In the attached drawing:

FIG. 1 is a simplified cross-sectional view, according to a longitudinal vertical plane, of a wine press according to the invention.

FIG. 3 is a schematic partial cross-sectional view of a variant of the same wine press.

DETAILED DESCRIPTION OF THE INVENTION

Figure 2A:
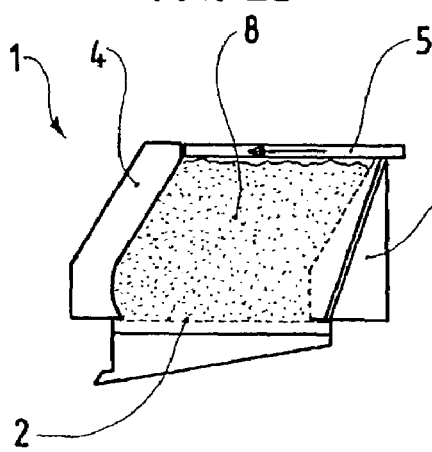
FIGS. 2a, 2b, 2c, 2d, 2e and 2f each show a longitudinal cross-sectional schematic view, according to a vertical plane, of a pressing phase in a wine press according to the invention.

When referring to FIG. 1, one can see that a wine press according to the invention includes a chamber 10 defined by a bottom formed of a filtering trough 2, retractable through adequate means of a known type, not shown, two side walls 3, only one of which can be seen, a cross-wall 4, a removable lid 5, and a movable tray 6 capable of moving, between the walls 3, towards the cross-wall 4 under the action of pushing means, in this case a hydraulic jack 60.

It should be noted that in this embodiment only the tray 6 is movable; it is however perfectly possible to imagine an embodiment in which the wall 4 is also movable, without therefore departing from the scope of the invention.

The movable tray 6 has, on the side of the chamber 10, a wall 61 divided, in the vertical direction, into two portions, a lower vertical portion 62 and an upper portion 63 inclined to the rear, i.e. towards the jack 60.

In this embodiment, the upper inclined portion 63 has a height substantially twice that of the lower vertical wall 62.

It should be noted that the wall 61 is perforated, so as to allow the must to flow out, which flows into the tray 6 that is hollow, in order to finally pass through the filtering trough 2 and to be collected by a collector element 7.

The cross-wall 4 has a profile substantially complementary to that of the movable tray 6; thus, it includes an upper portion 40 parallel to the portion 63, and, in front of the lower portion 62, a lower portion 41 with a concave profile. The lower portion 41 thus has a cross-section in the shape of an arch of a circle, which the upper portion 40 is tangent to.

It should however be noted that in a variant, not shown, the walls 40 and 63 are not parallel, but largely widen upwardly, which facilitates the collapsing of the marc cake.

When referring now to FIGS. 2a, 2b, 2c, 2d, 2e and 2f, various steps of the operation of the wine press according to the invention can be seen.

In FIG. 2a the grapes 8 are placed in the chamber 10 of the wine press 1, while the latter is closed by means of the lid 5.

Figure 2B:
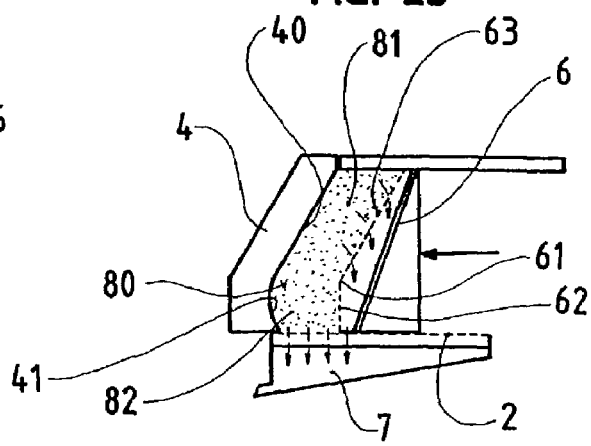

In FIG. 2b, the tray 6, under the action of the pushing means, not shown, presses the grapes 8 against the wall 4, and the must flows through the filtering trough 2 and the wall 61, to be collected and directed towards a vat, not shown.

One can see that under the action of the pressing and because of the profiles of the walls 4 and 61, the marc 8 adopts the shape of a block 80 that, in this embodiment of the wine press 1, includes an upper portion 81 resulting from nearing the portion 63 to the portion 40 and which is cantilevered with respect to a lower portion 82 resulting from nearing the portion 62 to the portion 41.

Figure 2C:
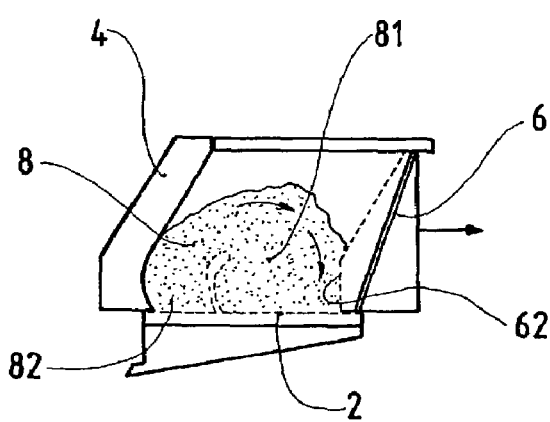

In FIG. 2c, in which can be seen the beginning of the crumbling operation, the tray 6 is drawn back, which causes the upper portion 81 to collapse, because of its cantilevered position. The portion 81 drops onto the filtering trough 2, at the front of the tray 6, between the lower portion 82 and the vertical portion 62 of the tray 6.

Figure 2D:
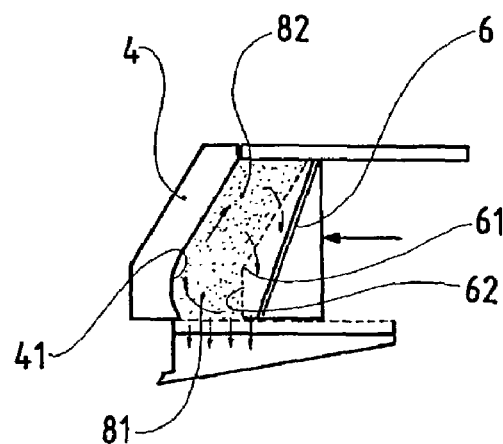

In FIG. 2d, the tray 6 is moved forward, in order to resume the pressing and, through the pushing of the vertical portion 62 of the wall 61 on the collapsed portion 81, and because of the concave shape 41, the portion 82 is pushed upwardly, which completes the crumbling operation, which is thus carried out automatically, without any manual intervention.

Figure 2E:
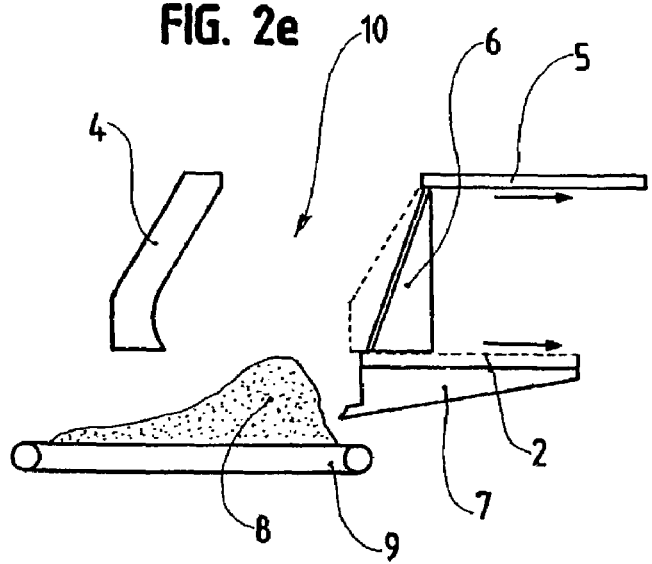

When the pressing is completed, the marc is removed, as shown in FIG. 2e, in which, after drawing back of the tray 6 and opening of the lid 5, the filtering trough 2 is retracted, while an evacuating means, in this case a conveyer belt 9 collects the marc escaping from the chamber 10.

Figure 2F:
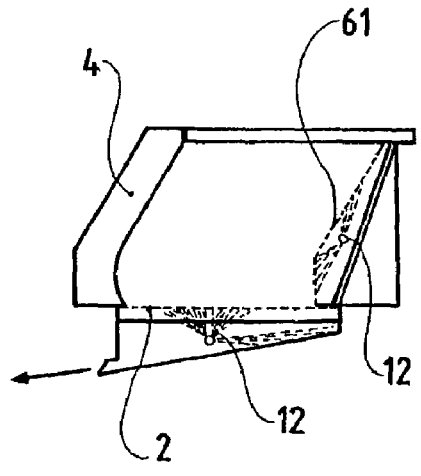

After complete removal of the marc, the wine press 1 is washed, in particular as shown in FIG. 2f, the bottom side of the filtering trough 2 and the inside of the tray 6 behind the perforated wall 61, which is performed by means of spraying nozzles 12.

When referring to FIG. 3, one can see that according to a variant the wall 61 of the movable tray 6 has, at the base of its lower portion 62, a transversally extending prominence 64 with a quarter-round cross-section aimed at enhancing the cantilevered position and, in particular, at undermining the base of the marc cake.

I claim:

1. A wine press for shaping and compressing a marc cake comprising:
    a chamber having an openable bottom and an interior; and
    a pressing means cooperative with said interior of said chamber, said pressing means having at least one horizontally movable tray movable within the interior of the chamber, said pressing means for shaping the marc cake into a block such that an upper portion of the block is cantilevered with respect to a lower portion of the block when said pressing means is moved away from the block, the upper portion of the block collapses toward said bottom of said chamber when said pressing means is moved away from the block, said tray comprises a perforated wall having a lower portion and an inclined upper portion for allowing a must of the marc cake to flow into said tray, said chamber having a wall facing said perforated wall, said wall of said chamber having an inclined upper portion complementary to said inclined upper portion of said prforated wall.

2. The wine press of claim 1, said tray having a convex profile at a bottom of said lower portion.

3. The wine press of claim 1, further comprising:
a means for moving said pressing means connected to said pressing means on a side opposite said chamber, said inclined upper portion of said perforated wall being inclined toward said means for moving.

4. The wine press of claim 3, said tray having at least one transversal prominence at a bottom of said lower portion.

5. The wine press of claim 1, said pressing means is configured to create turbulence in a non-collapsed portion of said block so as to cause the non-collapsed portion to raise within said chamber.

6. The wine press of claim 5, said wall of said chamber having a concave curved transversal portion below said inclined upper portion thereof.

7. The wine press of claim 6, said transversal portion having a constant arch-shaped cross-section, said inclined upper portion of said wall of said chamber extending tangentially to said transversal portion.

8. The wine press of claim 6, said lower portion is substantially vertical.

9. The wine press of claim 1, said wall of said chamber being in a fixed position relative to said tray.

* * * * *